(12) United States Patent
Fujimura et al.

(10) Patent No.: US 6,411,303 B1
(45) Date of Patent: Jun. 25, 2002

(54) METHOD OF EFFICIENTLY RECORDING A NUMBER OF TEXTURE IMAGES IN MEMORY

(75) Inventors: Kouta Fujimura; Yukinori Matsumoto, both of Tsukuba; Nobuya Suzuki, Ushiku; Takeshi Mogi, Matsudo, all of (JP)

(73) Assignee: Sanyo Electric Co., LTD, Osaka (JP)

( * ) Notice: Subject to any disclaimer, the term of this patent is extended or adjusted under 35 U.S.C. 154(b) by 0 days.

(21) Appl. No.: 09/140,859

(22) Filed: Aug. 27, 1998

(30) Foreign Application Priority Data

Aug. 29, 1997 (JP) .............................................. 9-234992

(51) Int. Cl.[7] .............................................. G06T 11/40
(52) U.S. Cl. ...................................... 345/582; 345/587
(58) Field of Search .............................. 345/430, 202, 345/513, 582, 587; 382/232

(56) References Cited

U.S. PATENT DOCUMENTS

| | | | | |
|---|---|---|---|---|
| 5,222,204 A | * | 6/1993 | Swanson ..................... | 345/427 |
| 5,222,205 A | * | 6/1993 | Larson et al. ................ | 345/430 |
| 5,224,208 A | * | 6/1993 | Miller, Jr. et al. ........... | 345/430 |
| 5,481,660 A | * | 1/1996 | Kurashige et al. ........... | 345/430 |
| 5,544,292 A | * | 8/1996 | Wisner ........................ | 345/430 |
| 5,659,672 A | * | 8/1997 | Yutaka et al. ................ | 345/430 |
| 5,696,892 A | * | 12/1997 | Redmann et al. ............ | 345/430 |
| 5,740,344 A | * | 4/1998 | Lin et al. ..................... | 345/516 |
| 5,745,739 A | * | 4/1998 | Wang et al. ................. | 345/430 |
| 5,905,502 A | * | 5/1999 | Deering ....................... | 345/420 |
| 5,947,823 A | * | 9/1999 | Nimura ........................ | 345/426 |
| 5,963,220 A | * | 10/1999 | Lee et al. .................... | 345/507 |
| 6,057,861 A | * | 5/2000 | Lee et al. .................... | 345/430 |
| 6,097,393 A | * | 8/2000 | Prouty, IV et al. .......... | 345/430 |

FOREIGN PATENT DOCUMENTS

| | | |
|---|---|---|
| JP | 6-176128 | 6/1994 |
| JP | 7-160989 | 6/1995 |

* cited by examiner

Primary Examiner—Jeffery Brier
Assistant Examiner—Anthony Blackman
(74) Attorney, Agent, or Firm—Pillsbury Winthrop LLP

(57) ABSTRACT

In order to store texture images in a smaller data amount, there is provided a method for recording a texture recording image 28 which contains a number of texture images in a memory to thereby record the images of the number of texture in the memory. In this method, the texture images are arranged on the texture recording image 28 based on the shape information of each texture such that a region not being occupied by the images can be reduced on the texture recording image 28.

4 Claims, 15 Drawing Sheets

| TEXTURE NO. | ORIGINAL VERTEX COORDINATE | ORIGINAL IMAGE NO. | REFERENCE VERTEX COORDINATE | ARRANGED VERTEX COORDINATE | MATCHED TEXTURE NO. | TEXTURE RECORDING IMAGE NO. | MATCHING VERTEX COORDINATE |
|---|---|---|---|---|---|---|---|
| 14a | 14b | 14c | 14d | 14e | 14f | 14g | 14h |
| 1 | $V_1(1)$ $V_2(1)$ $V_3(1)$ | 1 | $V_1(1)'$ $V_2(1)'$ $V_3(1)'$ | $V_1(1)''$ $V_2(1)''$ $V_3(1)''$ | | 1 | |
| 2 | $V_1(2)$ $V_2(2)$ $V_3(2)$ | 1 | $V_1(2)'$ $V_2(2)'$ $V_3(2)'$ | $V_1(2)''$ $V_2(2)''$ $V_3(2)''$ | | 1 | |
| 3 | $V_1(3)$ $V_2(3)$ $V_3(3)$ | 1 | $V_1(3)'$ $V_2(3)'$ $V_3(3)'$ | $V_1(3)''$ $V_2(3)''$ $V_3(3)''$ | | 1 | |
| | | | | | | | |
| n-1 | $V_1(n-1)$ $V_2(n-1)$ $V_3(n-1)$ | M | $V_1(n-1)'$ $V_2(n-1)'$ $V_3(n-1)'$ | $V_1(n-1)''$ $V_2(n-1)''$ $V_3(n-1)''$ | 2 | 1 | $V_1(n-1)'''$ $V_2(n-1)'''$ $V_3(n-1)'''$ |
| n | $V_1(n)$ $V_2(n)$ $V_3(n)$ | M | $V_1(n)'$ $V_2(n)'$ $V_3(n)'$ | $V_1(n)''$ $V_2(n)''$ $V_3(n)''$ | | M' | |

Fig. 2

(a) DOWNWARD TRIANGULAR TEXTURE (b) UPWARD TRIANGULAR TEXTURE

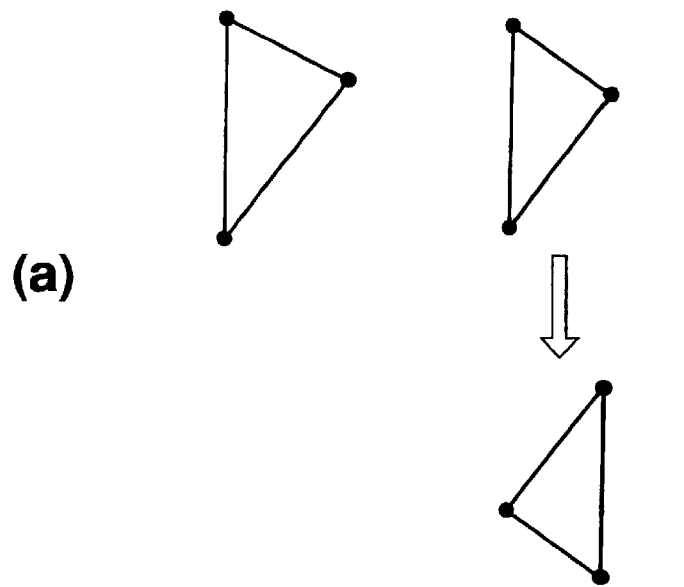
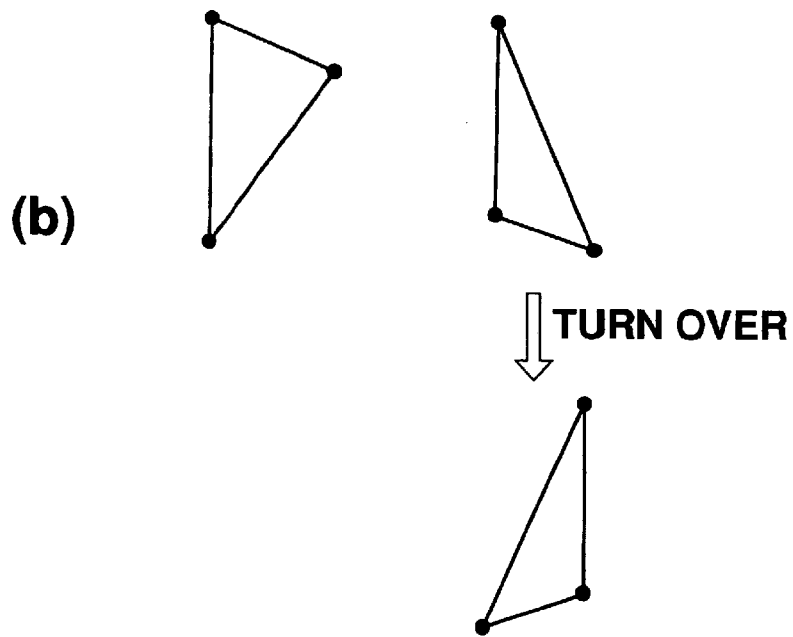
Fig. 12

METHOD OF EFFICIENTLY RECORDING A NUMBER OF TEXTURE IMAGES IN MEMORY

BACKGROUND OF THE INVENTION

1. Field of the Invention

The present invention relates to a texture recording method and a computer readable medium, and in particular to technology for storing a texture image in a memory of a small capacity.

2. Description of the Related Art

Conventionally, texture mapping technology is known as a method for easily creating a realistic solid computer graphic image. The term "texture" here means a design drawn on the surface of a solid. An image processing apparatus employing such technology handles data on the shape of a solid (shape data) and data on the design drawn on the surface of the solid (texture image data) separately. That is, initially, the apparatus temporarily places a solid created based on the shape data in a virtual 3D space in a memory, and then maps a texture image onto the surface of the solid.

A texture image for use in the above texture mapping technology is artificially made by using either computer graphics or a photo image. The thus obtained number of texture images are arranged on a relatively small number of texture recording images, and the texture recording images are compressed before being stored in a disk device, or the like.

To use the texture images for texture mapping, a compressed texture recording image is read from the disk device, and decompressed before being loaded into a memory in an image processing board, so that a necessary texture image is extracted from the texture recording image and mapped to a solid, or a modeling object.

However, the capacity of the memory for the development of a texture recording image is limited in the image processing board. If the texture recording image now loaded into the memory does not contain a texture image desired to be used for mapping, another texture recording image must be loaded by being read from a disk device or the like. In this view, a texture recording image is desired to contain as many texture images as possible in order to increase the speed of image processing using texture mapping.

Also, even when the aforementioned image processing board is not used, storing texture images in a small data amount will save the texture recording image, and increase a data reading speed.

SUMMARY OF THE INVENTION

The present invention has been conceived to overcome the above problems and aims to provide a texture recording method for recording a texture image in a smaller data amount, a computer readable medium which records a computer program, and a computer readable medium which records a texture recording image for recording texture images using the texture recording method.

Specifically, the object of the present invention is to provide a texture recording method which makes it possible to record a texture image in a smaller data amount by containing as many texture images as possible in a texture recording image through elimination of wasted space therein, a computer readable medium which records a computer program, and a computer readable medium which records a texture recording image for recording texture images using the texture recording method.

Another object of the present invention is to provide a texture recording method which makes it possible to record a texture image in a smaller data amount by applying a higher compression rate when compressing a texture recording image which contains texture images, while maintaining the quality of the texture image, a computer readable medium which records a computer program, and a computer readable medium which records a texture recording image for recording texture images using the texture recording method.

Still another object of the present invention is to provide a texture recording method which makes it possible to record a texture image in a smaller data amount by reducing a space between texture images (contained in the texture recording image) without enlarging the size of the texture images, a computer readable medium which records a computer program, and a computer readable medium which records a texture recording image for recording texture images using the texture recording method.

In order to achieve the above objects, according to a first aspect of the present invention, there is provided a texture recording method for recording a texture recording image containing images of a number of textures in a memory to thereby record the images of the number of textures in the memory, wherein the images of the number of textures are arranged on the texture recording image based on shape information of each texture such that a region other than a region occupied by the images is reduced on the texture recording image.

In general, when a number of texture images are arranged on a texture recording image to be contained therein, wasted space is inevitably caused between texture images. However, according to this invention, such wasted space can be reduced by utilizing the shape information such as the length of a side of a circumscribed rectangle of each texture, the type of shape of each texture (a triangle, a rectangle and so on), and the length of a side of each texture. As a result, more texture images can be contained in a texture recording image of the same size compared to a conventional design, and texture images can be stored in a smaller data amount.

The above arrangement enables high speed reading of a texture image from texture recording images. Moreover, more texture images can be loaded in a memory in the image processing board dedicated to texture mapping. This also helps increase an image processing speed.

Note that "a region occupied by the images" may include a necessary margin region.

Further, in the above texture recording method, the shape information of each texture includes information about a shape of a circumscribed rectangle of each texture.

In this invention, information about the shape of a circumscribed rectangle of each texture is used as a part of the shape information. The height and width of a circumscribed rectangle of a texture correspond to the maximum height and width of each texture image, respectively. Therefore, the use of such shape information enables efficient arrangement of a number of texture images on a texture recording image. That is, when the textures are sorted based on the width or height of circumscribed rectangles thereof, the images of the textures which inscribe rectangles of substantially the same height can be arranged side by side on a texture recording image. As a result, texture images can be stored in a smaller data amount.

Still further, in the above texture recording method, each texture is turned over or rotated before the image of each texture is arranged on the texture recording image.

In this invention, a texture is rotated or turned over for reduction of wasted space to achieve efficient arrangement of texture images on the texture recording image. This makes it possible to record texture images in a smaller data amount.

According to a second aspect of the present invention, there is provided a texture recording method for recording a texture recording image containing images of the number of textures in a memory to thereby record the images of the number of textures in the memory, wherein a predetermined texture is transformed into a predetermined shape, and the image of the transformed texture is arranged on the texture recording image.

In this invention, if it is judged for some texture that the image thereof cannot be efficiently arranged on a texture recording image because of its shape, a 2D affin transformation or the like is applied to that texture to transform the texture into such a shape that allows easy and efficient arrangement of the image thereof on the recording image before it is actually arranged. Arranging the image of the thus transformed texture on a texture recording image enables further reduction of wasted space.

Moreover, when a predetermined texture is transformed into a predetermined shape and arranged on a texture recording image based on the shape information of the transformed texture, wasted space can be reduced more efficiently.

Further, in the above texture recording method, when the number of textures includes a triangular texture, the triangular texture is transformed into a right-angled triangle, and the image of the transformed texture having a shape of a right-angled triangle is arranged on the texture recording image.

In this invention, a triangular texture is transformed into a right-angled triangular texture. Since a space is left outside the hypotenuse of the image of a right-angled triangular texture when arranged on a texture recording image, which is sufficient to store a congruous right-angled triangular texture, another triangular texture image can be preferably arranged on the space. This enables more efficient arrangement of texture images on the texture recording image, and helps record texture images in a much smaller data amount.

Still further, in the above texture recording method, when the number of textures includes a quadrangular texture, the quadrangular texture is transformed into a rectangular shape, and the image of the transformed texture having a rectangular shape is arranged on the texture recording image.

In this invention, a quadrangular texture is transformed into a rectangular texture which can be relatively easily arranged on a texture recording image without leaving waste space. This makes it possible to arrange texture images on a texture recording image without causing waste space. Also, when applying a 2D affin transformation or the like to many quadrangular textures, transformation into a rectangular texture, which is the most basic shape, can prevent significant deterioration of image quality.

According to a third aspect of the present invention, there is provided a texture recording method for recording a texture recording image containing images of the number of textures in a memory to thereby record the images of the number of textures in the memory, wherein at least a part of one or more images of the number of textures is arranged overlapping with at least a part of the image of another texture having a larger area.

In this invention, the whole or a part of one texture image is arranged overlapping with at least a part of another texture image. That is, a part of one texture image is also used as the image of another smaller texture. With this arrangement, some texture image is read from a part of a larger texture image arranged on a texture recording image.

This makes it possible to record still more texture images on a texture recording image of the same size compared to a conventional design in which each image occupies a unique region on a texture recording image. In other words, more texture images can be recorded in a much smaller data amount.

According to a fourth aspect of the present invention, there is provided a texture recording method for recording a texture recording image containing images of the number of textures in a memory to thereby record the images of the number of texture in the memory, wherein information is recorded in a region other than a region occupied by the images of the number of textures on the texture recording image, the information being determined based on pixel information of a texture arranged near the region.

Conventionally, since the image on a region surrounding a texture image is discontinuous with the texture image, the spatial frequency tends to be relatively high. In this invention, since such a surrounding region is supplied with pixel based on information regarding the adjacent texture images, spatial correlation can be enhanced in the texture recording image. As a result, when a texture recording image containing a texture image is subjected to image compression including an orthogonal transformation, such as Discrete Cosine Transform (DCT), a higher compression rate can be applied without significant deteriorating the quality of texture images. This makes it possible to record a number of texture images in a much smaller data amount.

According to a fifth aspect of the present invention, there is provided a texture recording method for recording a texture recording image containing an image of a texture which expresses a part of a modeling object in a memory, wherein an image of a region around the part of the modeling object is recorded in a region around the image of the texture on the texture recording image.

Conventionally, when displaying a texture image read from a texture recording image, the displayed image tends to become blurred at the joint with other texture images partly because pixel information about a region surrounding the texture image may also be read by calculation error and displayed.

As a method to avoid the above, each texture image is arranged on a texture recording image, having a slightly larger size than its original texture to comprise more pixels, so that calculation error, if it occurs, will not adversely affect the displayed image. However, this method is problematic in that it increases a data amount for recording a texture image.

According to the present invention, a region around a texture image on a texture recording image is given an image of a region around the part corresponding to the texture image of a modeling object. This arrangement can solve the above problem without significantly increasing a data amount. That is, even if the pixel information about a region around an aimed texture image is read by calculation error and displayed, since the image of the modeling object is also displayed for the mistakenly read region, the entire displayed image does not become significantly blurred. Also, the use of a surrounding region of a texture image to store pixel information will not cause a significant increase in the data amount because the surrounding region is originally used as a margin. With the above arrangement, it is possible to prevent a displayed image from becoming blurred while suppressing a significant increase in the data amount.

In addition to the above method, the present invention also relates to a computer readable medium which stores a program for having a computer use the aforementioned method. The use of such a computer readable medium can achieve similar advantages to those described above.

According to a sixth aspect of the present invention, there is provided a computer readable medium recording a texture recording image containing images of a number of textures, wherein the images of the number of textures are arranged on the texture recording image based on shape information of each texture such that a region other than a region occupied by the images is reduced on the texture recording image.

In general, when a number of texture images are arranged on a texture recording image to be contained therein, waste space is inevitably caused between texture images. However, according to this invention, such waste space can be reduced by utilizing the shape information such as the length of a side of a circumscribed rectangle of each texture, the type of shape of each texture (a triangle, a rectangle and so on), and the length of a side of each texture. As a result, more texture images can be contained in a texture recording image of the same size compared to a conventional design, and texture images can be stored in a smaller data amount.

The above arrangement enables high speed reading of a texture image from texture recording image. Moreover, more texture images can be loaded in a memory in the image processing board dedicated to texture mapping. This also helps increase an image processing speed.

Further, in the above computer readable medium, the shape information of each texture includes information about a length of one side of a circumscribed rectangle of each texture, so that the images of the number of textures are arranged on the texture recording image based on the length of one side of the circumscribed rectangle.

On a texture recording image recorded in a computer readable medium of this invention, texture images are arranged continuous to adjacent ones by utilizing the information about the length of one side of the circumscribed rectangle of each texture. Since the length of a side of a circumscribed rectangle represents a substantial size of a texture, texture images in the substantially same size can be arranged collectively on a texture recording image based on the length of one side of a circumscribed rectangle used as a reference. With the above, more texture images can be recorded in a texture recording image.

Moreover, texture images can be further efficiently arranged on a texture recording image through an arrangement in which a circumscribed rectangle of each texture is defined such that one side thereof contains one side of that texture, and placed such that one side thereof is substantially parallel to that of another texture.

Still further, in the above computer readable medium, the number of textures include triangular textures, and some of them are arranged on the texture recording image such that a vertex thereof having the smallest angle points in a first direction. Moreover, substantially the same number of triangular textures as the above are arranged on the texture recording image such that a vertex thereof having the smallest angle points in a second direction which is substantially opposite to the first direction.

Note that "direction which is substantially opposite" includes "direction directly opposite", and "substantially the same number" includes "the exact same number". The above makes it possible to arrange more texture images on a texture recording image while effectively utilizing the shape information about the texture images.

According to a seventh aspect of the present invention, there is provided a computer readable medium recording a texture recording image containing images of a number of textures, wherein an image of a texture transformed into a predetermined shape is recorded on the texture recording image.

In this invention, if it is judged for a texture that the image thereof cannot be efficiently arranged on a texture recording image because of its shape, a 2D affin transformation or the like is applied to that texture to transform the texture into a shape that allows easy and efficient arrangement of the image thereof on the recording image before the image thereof is actually arranged. This makes it possible to arrange more texture images on a texture recording image.

According to an eighth aspect of the present invention, there is provided a computer readable medium recording a texture recording image containing images of a number of textures, wherein at least a part of one or more images of the number of textures is arranged overlapping with at least a part of the image of another texture having a larger area.

In this invention, a texture image is read from a part of another larger texture image contained in a texture recording image. This makes it possible to record more texture images in a smaller data amount.

According to a ninth aspect of the present invention, there is provided a computer readable medium recording a texture recording image containing images of a number of textures, wherein information is recorded in a region other than a region occupied by the images of the number of textures on the texture recording image, the information being determined based on pixel information of a texture arranged near the region.

According to the present invention, when a texture recording image containing a texture image is subjected to image compression including an orthogonal transformation, such as Discrete Cosine Transform (DCT), a higher compression rate can be applied without significant deteriorating the quality of texture images. This makes it possible to record a number of texture images in a much smaller data amount.

Note that the term "a computer readable medium recording a texture recording image" used in this specification includes not only a computer readable medium which records a texture recording medium in the form of bit map data but also that which records a texture recording medium subjected to any data transformation, such as compression.

According to a tenth aspect of the present invention, there is provided a computer readable medium recording a texture recording image containing an image of a texture which expresses a part of a modeling object, wherein an image of a region around the part of the modeling object is recorded in a region around the image of the texture on the texture recording image.

According to the present invention, even if the pixel information about a region around an aimed texture image is read by calculation error and displayed, since the image of the modeling object is also displayed for the mistakenly read region, the displayed image does not become significantly blurred. Also, the use of a surrounding region of a texture image to store pixel information will not cause a significant increase of a data amount because the surrounding region is originally used as a margin. With the above arrangement, it is possible to prevent a displayed image from becoming blurred while suppressing a significant increase in the data amount.

BRIEF DESCRIPTION OF THE DRAWINGS

The above and the other objects, features, and advantages of the present invention, will become further apparent from the following description of the preferred embodiment taken in conjunction with the accompanying drawings wherein:

FIG. 2 is a diagram schematically showing the information recorded in a texture vertex data base;

FIG. 12 is a diagram for explaining a part of the second rearrangement processing;

DESCRIPTION OF THE PREFERRED EMBODIMENTS

In the following, a preferred embodiment of the present invention will be described with reference to the accompanying drawings. The following description which mainly concerns a texture recording method will also clarify a preferred embodiment of a computer readable medium which records a texture image using this method.

1. Structure

Figure 1:
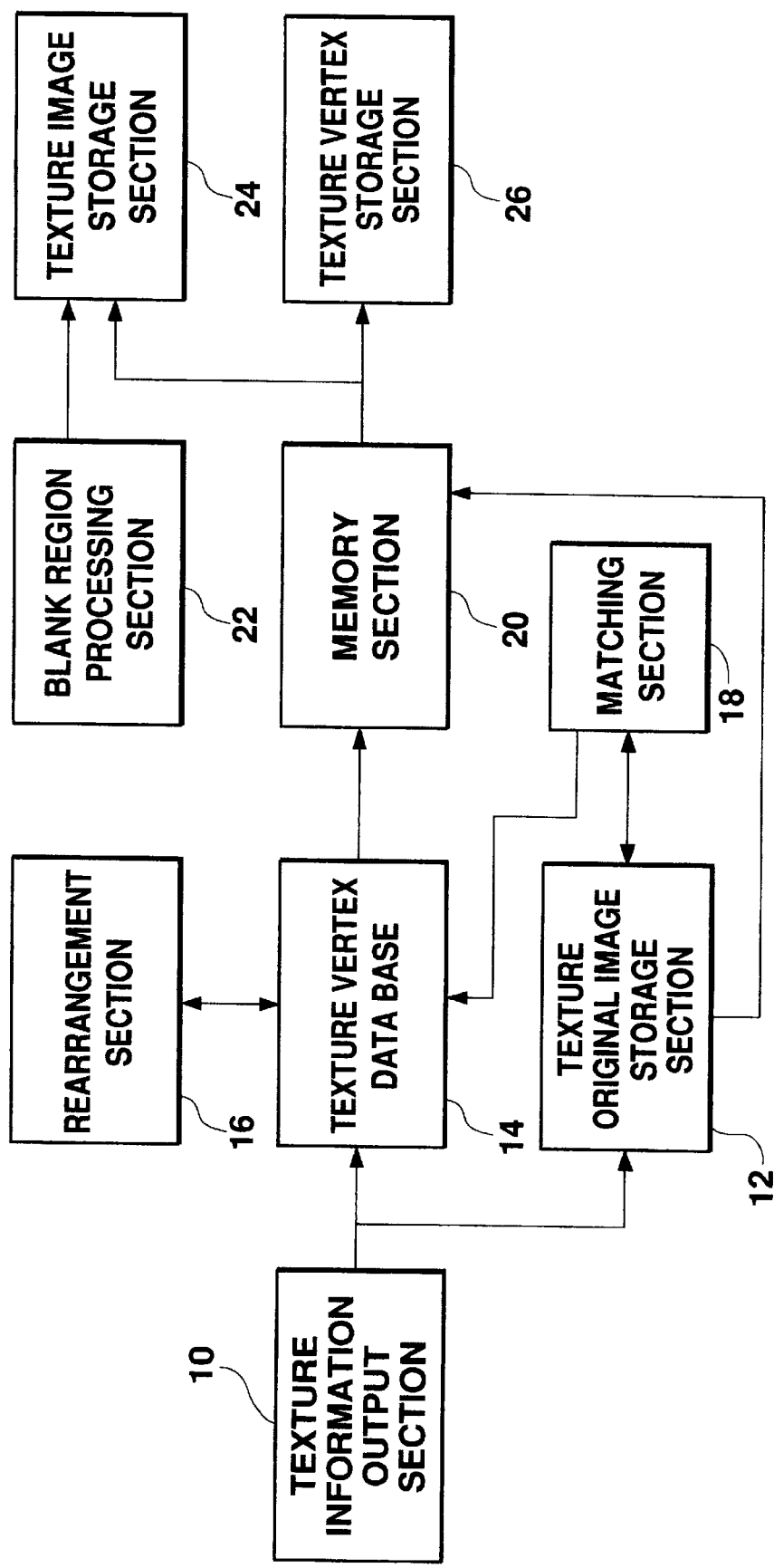
FIG. 1 is a diagram showing a structure of an apparatus for carrying out a texture recording method according to a preferred embodiment of the present invention.

Referring to FIG. 1, showing the structure of an apparatus for carrying out a texture recording method of this invention, the apparatus comprises a texture information output section 10, a texture original image storage section 12, a texture vertex data base 14, a rearrangement section 16, a matching section 18, a memory section 20, a blank region processing section 22, a texture image storage section 24, and a texture vertex storage section 26.

The texture information output section 10 includes a CCD camera and a turn table for carrying a modeling object. The section 10 outputs information of a texture image which expresses a modeling object, and vertex coordinates of the texture image (a pixel position of a texture image) which are calculated using a known operation based on an image taken by the CCD camera and the turn angle of the turning table.

The texture original image storage section 12 stores the texture image outputted by the output section 10.

The texture vertex data base 14 temporarily stores vertex coordinates of each texture image, and also stores the information obtained by the rearrangement section 16 and the matching section 18.

Here, the contents of the texture vertex data base 14 will be described in detail.

Referring to FIG. 2 showing the content of the texture vertex data base 14 schematically illustrated in the form of a table, the data base 14 stores a texture number 14a, an original vertex coordinate 14b, an original image number 14c, a reference vertex coordinate 14d, an arranged vertex coordinate 14e, a matched texture number 14f, a texture recording image number 14g, and a matching vertex coordinate 14h. These data are stored corresponding to one another.

The texture number 14a column stores ID numbers for identifying a number of textures supplied by the texture information output section 10.

The original vertex coordinate 14b column stores 2D positional coordinates of each texture image, which define the position of each texture image which is arranged on an image stored in the texture original image storage section 12.

Specifically, the original vertex coordinate 14b column stores coordinates of the three vertexes of a texture image in this embodiment as each texture is rectangular in this case.

Figure 3A:
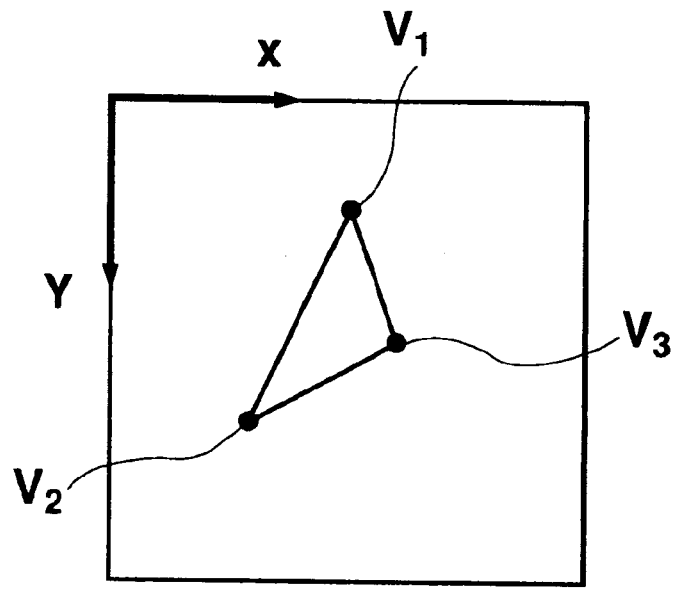
FIG. 3A is a diagram showing three vertexes of an original texture image.

Referring to FIG. 3A showing an example of a texture image contained in an image stored in the storage section 12, the image in the storage section 12 has a region storing a texture image and a region storing other images. The apparatus of this invention sets an X-Y coordinate system on the image so that a texture image contained therein can be extracted therefrom by utilizing vertex coordinates in this X-Y coordinate system. Therefore, the three vertex coordinates of a texture image stored in the original vertex coordinate 4b column are expressed based on the X-Y system. Data in the column 4b uses an integer to indicate a pixel position in the image data stored in the storage section 12.

The original image number 14c column stores an ID number of the image stored in the storage section 12, e.g., the name of a file which stores a texture image.

Figure 3B:
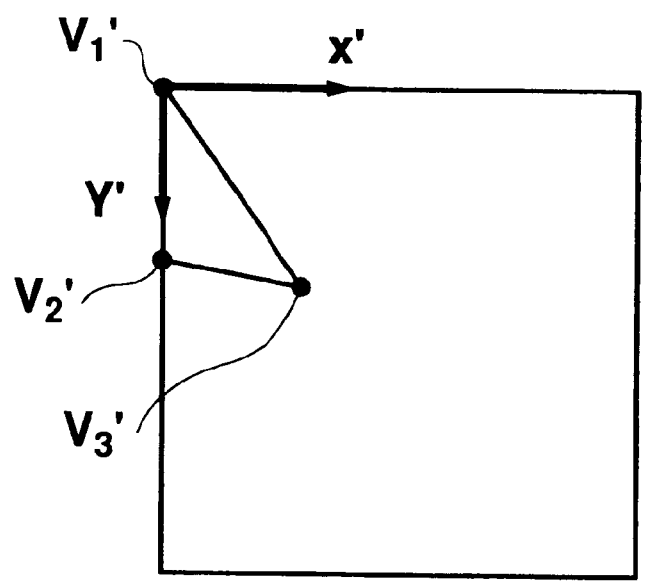
FIG. 3B is a diagram for explaining a reference vertex coordinate.

The reference vertex coordinate 14d column stores vertex coordinates of a texture image which are actually used by the rearrangement section 16. Here, if the data on vertex coordinates supplied from the output section 10 and stored in the original vertex coordinate 14b column is used intact for texture rearrangement (described later) by the rearrangement section 16, the rearranging processing would become complicated, because the three vertexes may have any positional relationship in the data, as shown in FIG. 3A. In order to simplify the rearranging processing, in this apparatus, the vertex coordinates stored in the original vertex coordinate 14b column are processed in a predetermined congruent transformation into reference vertex coordinates as shown in FIG. 3B, and the resultant reference vertex coordinates are stored in the reference vertex coordinate 14d column. Note that the X'-Y' coordinate system shown in FIG. 3 is set for every texture.

As will be obvious from FIGS. 3A and 3B, three vertexes of a texture image maintain the same relative positional relationship before and after the transformation. After the transformation, the upper left vertex of the texture is set at the origin of the X'-Y' coordinate. One of the other vertexes of the texture is set on the Y' axis, and the remaining one vertex is positioned in the first quadrant of the X'-Y' coordinate system. In this method, the second longest side of the three sides of a texture is set overlapping with the Y' axis (described later).

When normalization (described later) is applied, vertex coordinates after normalization can be used as reference vertex coordinates, which are thus stored in the reference vertex coordinate 14d column.

The arranged vertex coordinate 14e column stores the three vertex coordinates defining a position of each texture image to be arranged on a texture recording image 28 stored in the texture image storage section 24 and, specifically, stores data outputted by the rearrangement section 16. Note that, referring to FIGS. 4 or 5, the vertex coordinates stored in the arranged vertex coordinate 14e column are expressed based on an X"-Y" coordinate system which is set on every texture recording image 28.

The texture recording image number 14g column stores an ID number (a file name) of a texture image 28 on which a texture image is arranged.

If the image of a texture with an ID number stored in the column 14a matches to a part of the image of another texture, in other words, if one texture has high similarity or is highly coincident with a part of another texture, the ID number of the latter texture, or a matched texture, is stored in the matched texture number 14f column.

The matching vertex coordinate 14h column stores information to specify a matching position in a matched texture image based on a reference vertex system, i.e., information about a position in the image of a matched texture. Specifically, the matched texture number 14f column, the texture recording image number 14g column, and the matching vertex coordinate 14h column store information outputted from the matching section 18.

Take as a matching example the case shown in FIG. 2 in which the $(n-1)^{th}$ texture matches to a region defined by points $V_1^{(n-1)'''}$, $V_2^{(n-1)'''}$, $V_3^{(n-1)'''}$ in the image of the $2^{nd}$ texture. The image of the $(n-1)^{th}$ texture is not stored in the texture image storage section 24 (described later), and instead the defined region in the image of the $2^{nd}$ texture is read as the image of the $(n-1)^{th}$ texture for use in texture mapping.

Referring again to FIG. 1, the memory section 20 calculates a transformation matrix for 2D affin transformation between the data stored in the original vertex coordinate 14b column and the arranged vertex coordinate 14e column based on the data stored in the column 14b, 14e.

The memory section 20 then determines which part of the image stored in the storage section 12 is to be stored in the texture image storage section 24. That is, conventionally, only a region corresponding to a texture of the image in the texture original image storage section 12 is stored in the texture image storage section 24. According to the method of the present invention, on the other hand, a region surrounding the texture image region is also stored, together with the texture image region, in the texture image storage section 24, so that the section 24 stores an image that is slightly larger for each texture. Then, only the texture image region out of this slightly larger texture image is generally read for use in texture mapping. However, if a calculation error occurs, the image on the surrounding region of the texture image region is also read and displayed. With this arrangement, the relevant texture can be easily reproduced as a clear displayed image without causing a blurred part at the joint with other texture in spite of a calculation error.

After the determination of the part to be read, the memory section 20 actually reads the determined part, i.e., a texture image and the image on the surrounding region thereof, from the texture original image storage section 12, and calculates the coordinates of a position where the texture image and the surrounding image are stored on the texture recording image 28 in the texture image storage section 24, using the aforementioned transformation matrix. The memory section 20 then loads the images to the calculated position on the texture recording image 28 identified by an ID number recorded in the texture recording image number 14g column, and loads the texture vertexes storage section 26 with respective three vertex coordinates of a number of textures stored in the texture image storage section 24 together with the ID number of the texture recording image 28 recorded in the texture recording image number 14g column.

Figure 6:
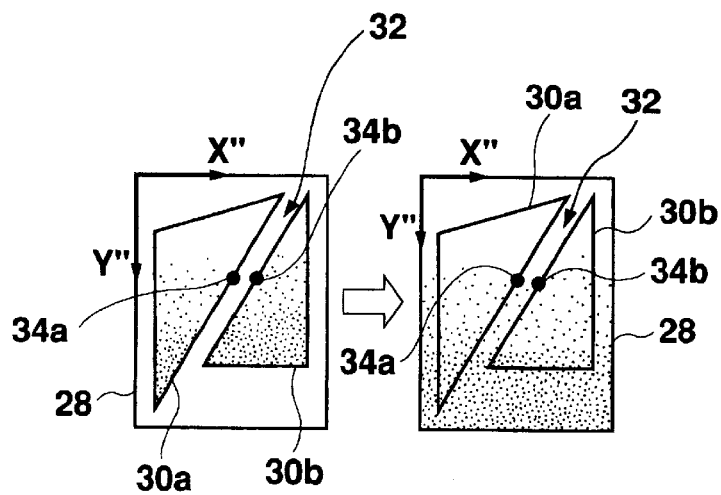
FIG. 6 is a diagram for explaining the processing by a blank region processing section.

The blank region processing section 22 stores a region intervening between a number of texture images on the texture recording image 28, i.e., a region which stores nothing, with predetermined pixel information. That is, a blank region between texture images on a texture recording image 28 is given pixel information based on the information of the pixels contained in the texture images to thereby improve spatial correlation of the texture recording image 28. Specifically, an average color of the colors given to the sides of adjacent textures images is obtained, and given to the region between the sides. Alternatively, referring to FIG. 6, when a texture recording image 28 contains a number of texture images including adjacent texture images 30a and 30b with a blank in between, the pixels in the intervening region are given a color such that the color tone varies gradually based on the colors given to the points 34a, 34b respectively on the opposing two sides of the texture images 30a, 30b having the same X" or Y" axial coordinate. This arrangement makes it possible to improve spatial correlation of the texture recording image 28, and to increase a compression rate applied in a compression method including an orthogonal transformation.

2. First Rearrangement

Next, first rearrangement processing by the rearrangement section 16 will be described.

Figure 7:
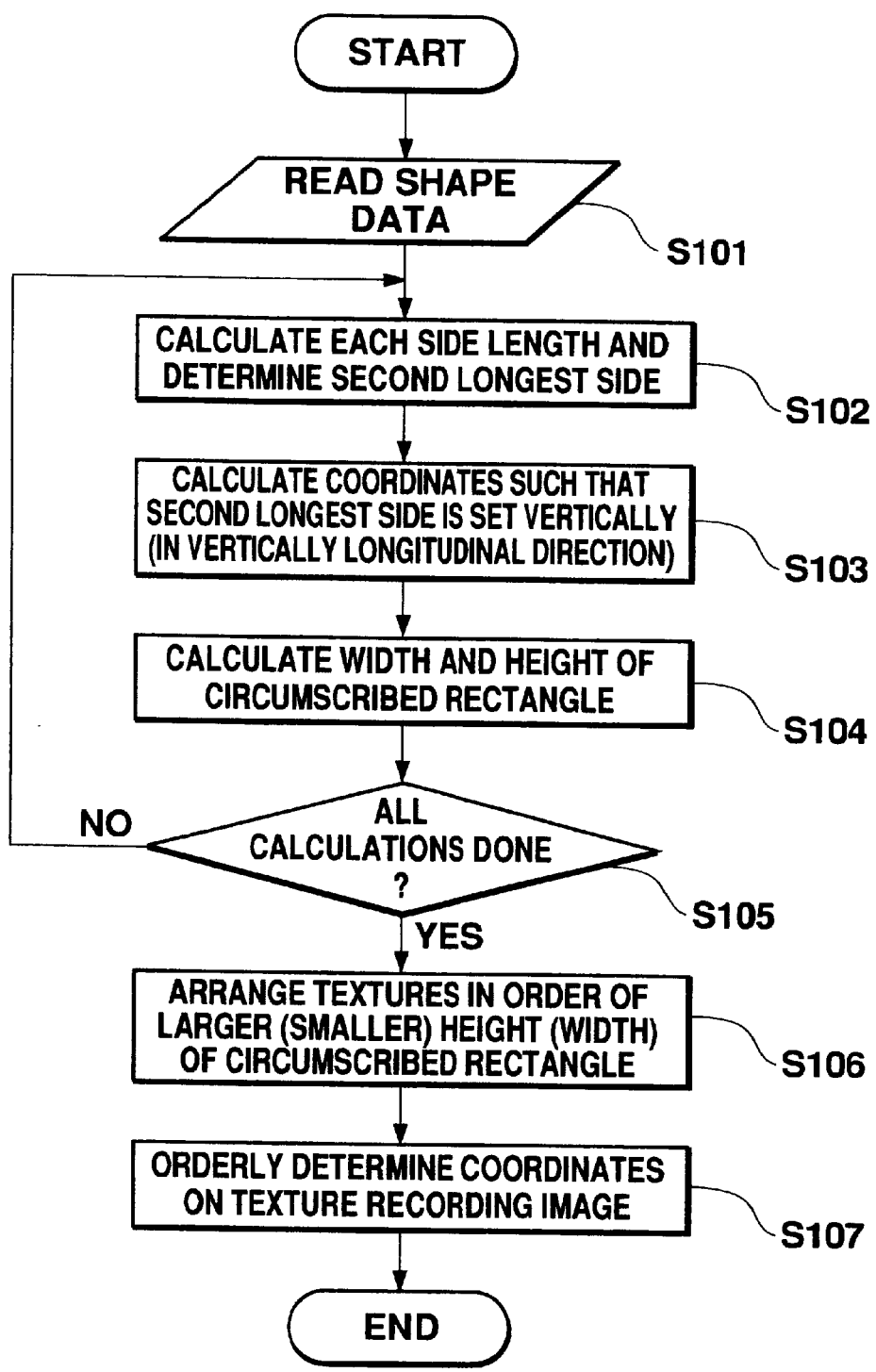
FIG. 7 is a flowchart for explaining a first rearrangement processing.

Referring to FIG. 7 showing a flowchart for explaining the rearranging processing by the rearrangement section 16, the rearrangement section 16 reads vertex coordinates of each texture from the original vertex coordinate 14b column in the data base 14 (S101). The rearrangement section 16 then calculates the length of each side of the texture using the vertex coordinates, and determines the second longest side thereof (S102).

Subsequently, the section 16 transforms the three vertex coordinates of the texture such that the second longest side of the texture falls on the Y' axis of an X'-Y' coordinate system, as shown in FIG. 3B (S103). With the transformation, the upper left vertex of the circumscribed rectangle of the texture is set on the origin of the texture plane here, and other vertexes are set in the first quadrant of the X'-Y' coordinate system. The three thus calculated vertex coordinates are stored in the reference vertex coordinate 14d column.

Figure 8:
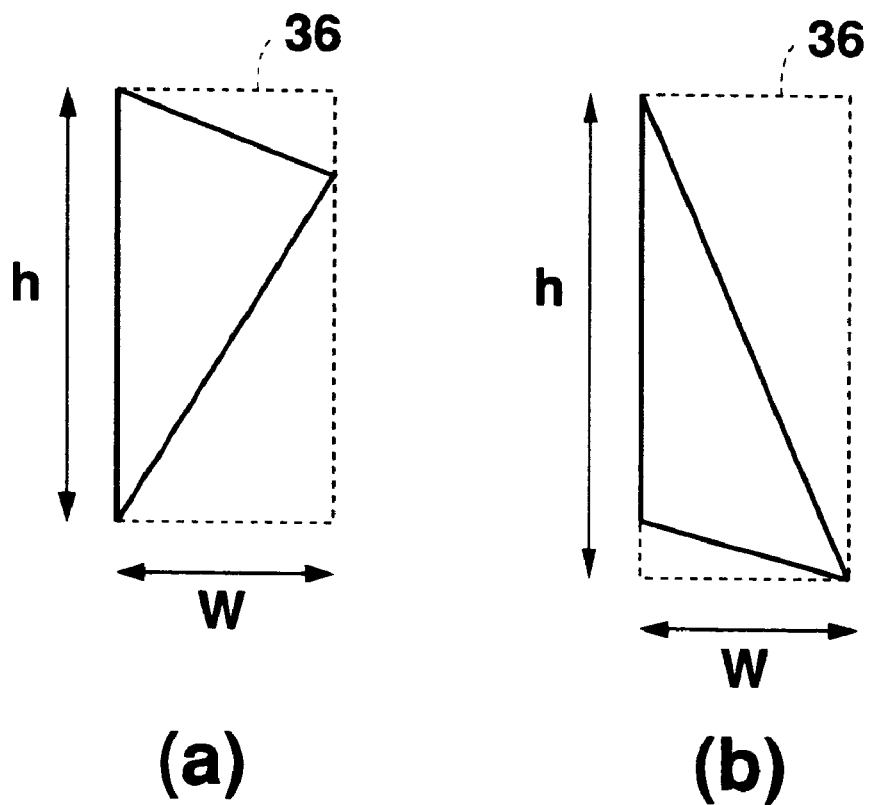
FIG. 8 is a diagram indicating a circumscribed rectangle of a texture.

The rearrangement section 16 next calculates the height h and width w of the circumscribed rectangle of each texture (S104). Note that, referring to FIG. 8, a circumscribed rectangle 36 is defined such that one side thereof contains the second longest side of the texture, and the opposing side contains the vertex of the texture other than those at the ends of the second longest side.

The above process at S102 to S104 is conducted with respect to all of the textures supplied from the texture information output section 10 (S105). Based on the height or width of a circumscribed rectangle 36 of each texture, all textures are numbered in the order of a larger height h of a circumscribed rectangle 36. Specifically, the texture numbers in the column 14a are sorted so as to be arranged in the order of a larger height h of a circumscribed rectangle 36. Textures with circumscribed rectangles of the same height h are sorted again based on the width w of the circumscribed rectangles 36. The above sorting results in sequentially arranging all textures according to their sizes. Note that, although the textures with circumscribed rectangles having the same height h are sorted again based on the width w in the above, textures with circumscribed rectangles having a height h in a predetermined range may be sorted based on the width w.

Then, the rearrangement section 16 calculates the coordinates of a position where each texture image is arranged on a texture recording image 28 (arranged vertex coordinate 14e) based on the data in the texture number 14a column and the reference vertex coordinate 14d column of the data base 14.

Figure 4:
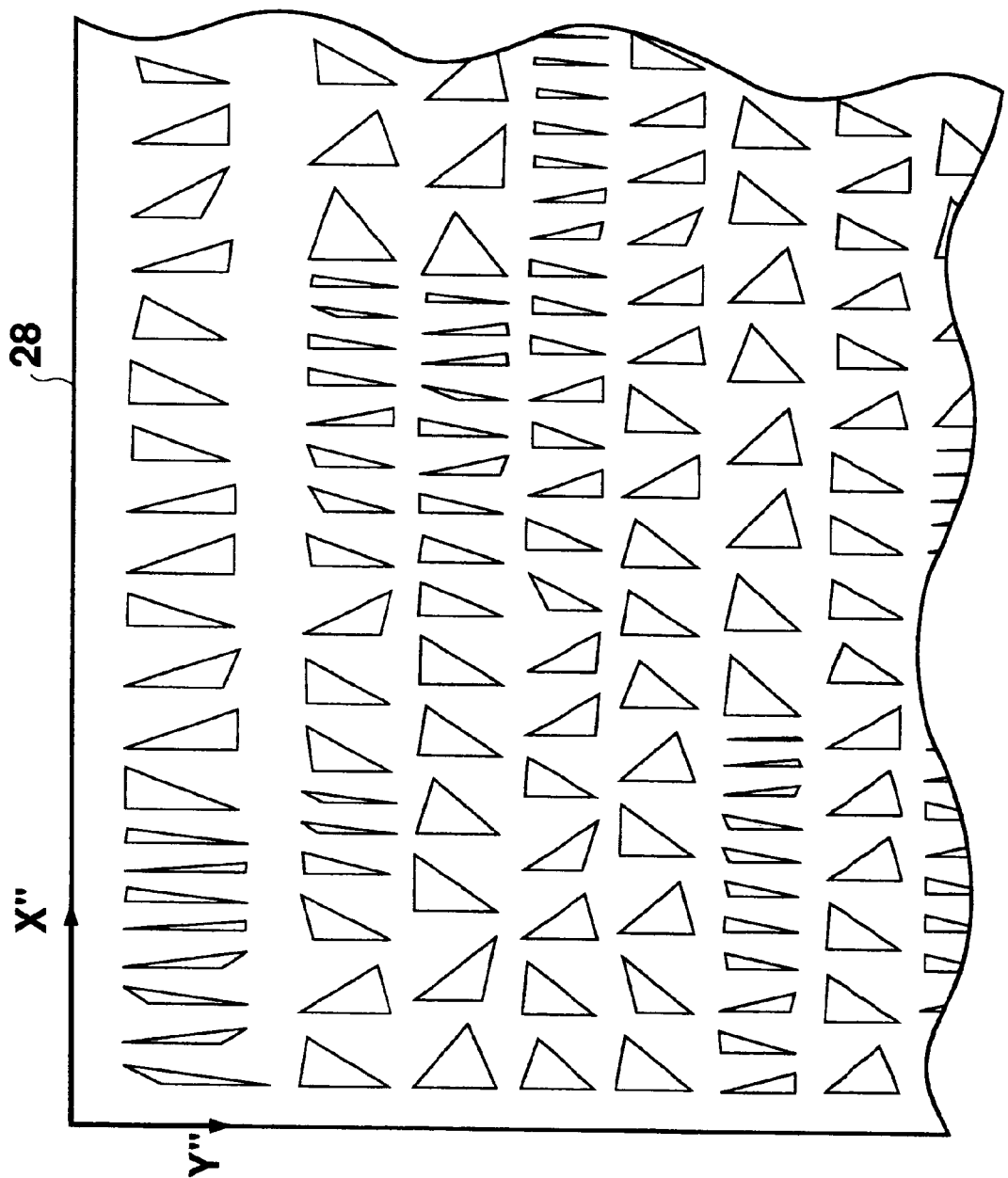
FIG. 4 is a diagram for explaining arrangement of a texture image on a texture recording image according to the preferred embodiment of the present invention.
Figure 5:
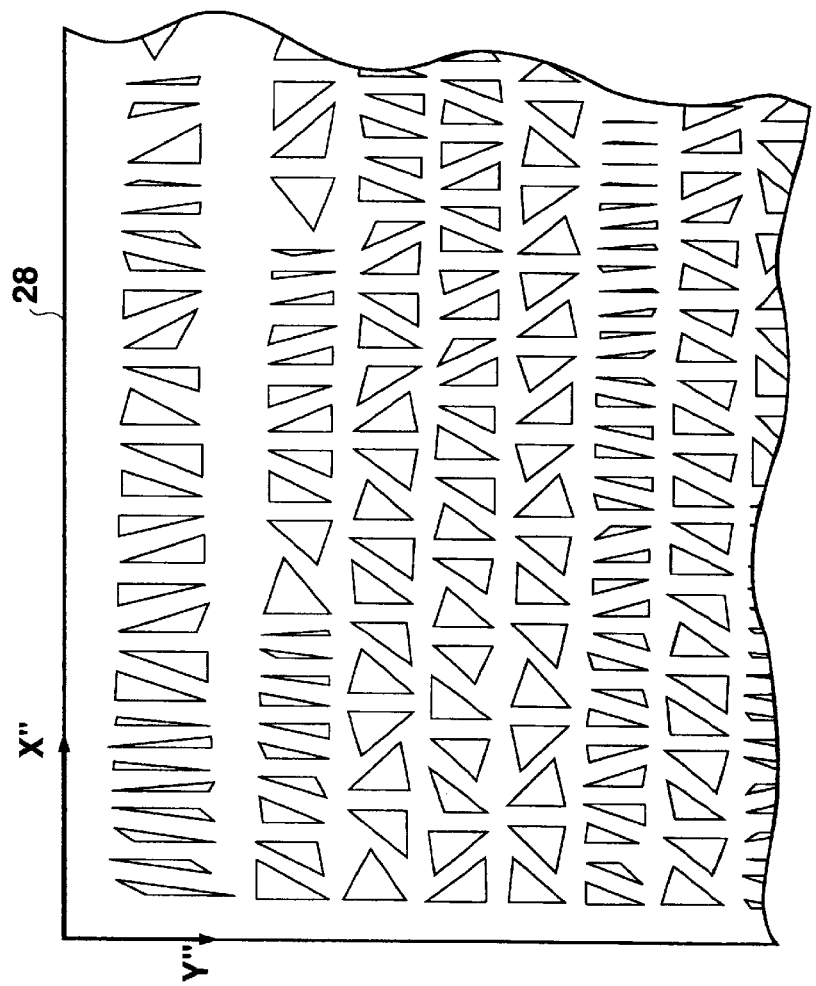
FIG. 5 is a diagram for explaining arrangement of a texture image on a texture recording image according to the preferred embodiment of the present invention.

More specifically, coordinates of an arranged vertex are determined such that, as shown in FIG. 4, texture images are sequentially arranged according to the sorted texture numbers 14a on a texture recording image 28 along the X" axis of an X"-Y" system while leaving a margin between adjacent textures.

After having arranged a texture at the rightmost part of the texture recording image 28, the value for the Y" axis of an arranged vertex coordinate 14e is increased so as to ensure a predetermined margin in the direction of the Y" axis before resuming sequential arrangement of textures from the left to right side on the texture recording image 28.

In the above, the texture recording image in use is given an ID number. The obtained vertex coordinates of each texture and the ID number of the texture recording image 28 are stored in the arranged vertex coordinate 14e column and the texture recording image number 14g column, respectively.

With the above processing, a number of texture images can be easily and efficiently arranged on a texture recording image 28 by utilizing the information indicative of the height h or width w of a circumscribed rectangle of each texture.

3. Second Rearrangement

Referring again to the flowchart of FIG. 7, the process at S107 may be replaced by a different process to conduct different rearrangement processing.

Figure 9:
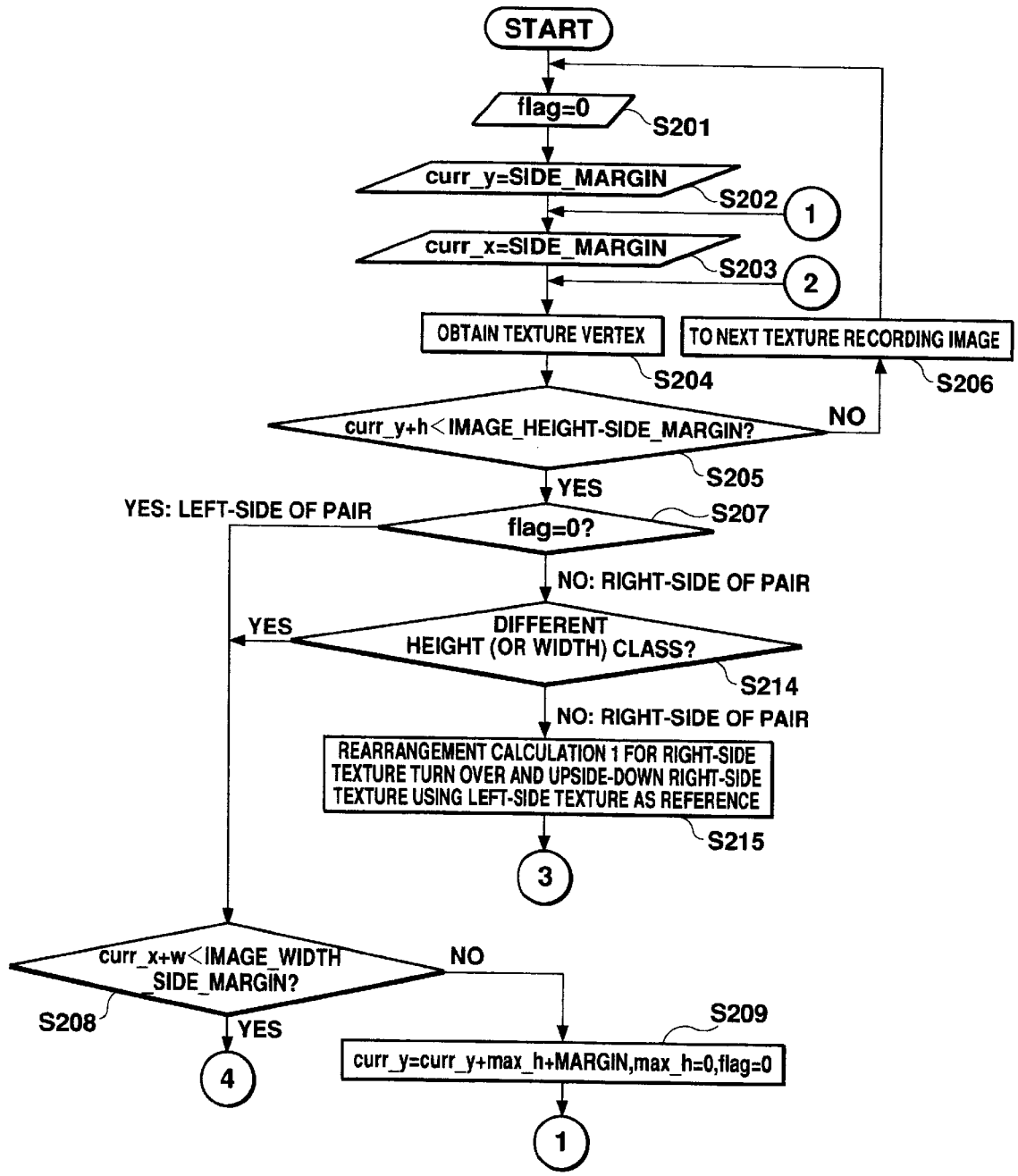
FIG. 9 is a flowchart for explaining a second rearrangement processing.
Figure 10:
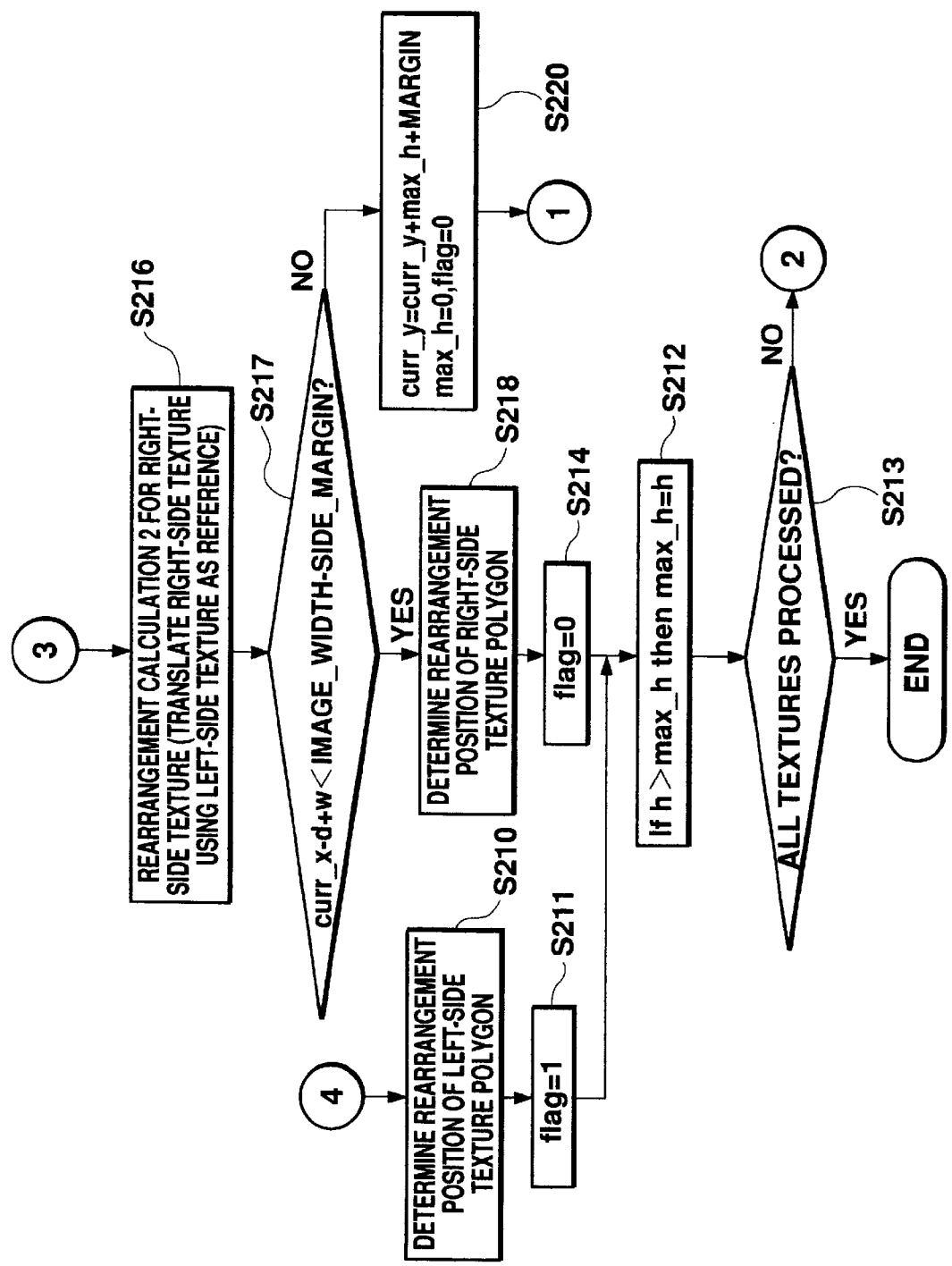
FIG. 10 is a flowchart for explaining the second rearrangement processing.

Referring to FIGS. 9 and 10, showing a flowchart for explaining a second rearrangement processing by the rearrangement section 16, variables "flag", "curr_y", "curr_x", and "max_h" are temporarily stored in a working memory (not shown).

In the second rearrangement processing, two textures in the same or substantially same size are paired when arranged on a texture recording image. The variable "flag" indicates whether an object texture is a left-side or right-side texture of paired textures. A variable "flag" with 0, or flag=0, indicates a left-side texture, while a variable "flag" with 1, or flag=1, indicates a right-side texture. The variable "curr_y" indicates the value of the Y" axis in an X"-Y" coordinate system set on the texture recording image 28, while the variable "curr_x" indicates the value of the X" axis. The variables "curr_y" and "curr_x" are used as reference in arranging a current object texture (a current rearrangement object) on a texture recording image 28.

In operation, referring to FIG. 9, the variable "flag" is initialized to 0 (S201). The variable "curr_y" is initialized to a value of a pre-defined SIDE_MARGIN (S202), and the variable "curr_x" is initialized to a value of a pre-defined SIDE_MARGIN (S203). Then, the rearrangement section 16 obtains three reference vertex coordinates of a texture from the reference vertex coordinate 14d column in the data base 14, and calculates the height h and width w of the circumscribed rectangle 36 of the texture.

Subsequently, the rearrangement section 16 detects whether or not the following expression is held (S205).

$$\text{curr}\_y + h < \text{IMAGE\_HEIGHT} - \text{SIDE\_MARGIN} \qquad (1)$$

wherein IMAGE_HEIGHT indicates the height of a texture recording image 28. If this expression is not held, it is known that no more texture image can be arranged (recorded) in that texture recording image 28. The rearrangement section 16 therefore starts rearrangement processing using the next texture recording image 28 (S206).

On the other hand, if the expression is held at S205, the rearrangement section 16 then detects whether or not the variable "flag" is 0 (S207). If flag=0, the rearrangement section 16 judges that the current object texture is a leftside texture and then detects whether or not the following expression is held (S208).

$$\text{curr}\_x + h < \text{IMAGE\_WIDTH} - \text{SIDE\_MARGIN} \qquad (2)$$

wherein IMAGE_WIDTH indicates the width of a texture recording image 28. If this expression is not held, it is known that no further texture image can be arranged (recorded) in that line (a region corresponding to the same curr_y, and this is similarly applied in the following) on that texture recording image 28. Therefore, the values of the variables "curr_y", "max_h", and "flag" are updated according to the next expressions (S209).

$$\text{curr}\_y = \text{curr}\_y + \text{max}\_h + \text{MARGIN}$$

$$\text{max}\_h = 0$$

$$\text{flag} = 0 \qquad (3)$$

Returning to S208, if the expression is held, the rearrangement section 16 begins rearrangement processing with respect to the left-side texture (S210 in FIG. 10). Specifically, vertex coordinates of a position where the light-side texture is to be rearranged on a texture recording image 28 are calculated according to the following expressions.

$$X1' = X1 + \text{curr}\_x$$

$$X2' = X2 + \text{curr}\_x$$

$$X3' = X3 + \text{curr}\_x$$

$$Y1' = Y1 + \text{curr}\_y$$

$$Y2' = Y2 + \text{curr}\_y$$

$$Y3' = Y3 + \text{curr}\_y \qquad (4)$$

After the above, the rearrangement section 16 updates the value of the "curr_x" for rearrangement of the next texture.

$$\text{curr}\_x = \text{curr}\_x + w + \text{MARGIN} \qquad (5)$$

The section 16 then returns the value of "flag" to 1 (S211) in order to temporarily load a working memory with the information that the next texture is a right-side texture. Then, if the height h of the circumscribed rectangle 36 of the current object texture is higher than "max_h" which is temporarily stored in a working memory (not shown), the rearrangement section 16 loads the working memory with the height h of the circumscribed rectangle 36 of the current object texture as new "max_h" to thereby update the maximum height of the circumscribed rectangles 36 of the textures arranged in a region corresponding to the same "curr_y" (S212).

The above process at S204 to S212 is repeated until all textures are processed (S213).

Returning to S207, if flag≠0, the rearrangement section 16 judges that the current object texture could be a right-side texture. The section 16 then detects whether or not the current object texture belongs to a different class, in terms of height and width, to that of the immediately preceding texture (S214). If it does, or YES in s214, the current object texture is judged as a left-side texture, and the process at S208 and after is carried out.

Figure 11:
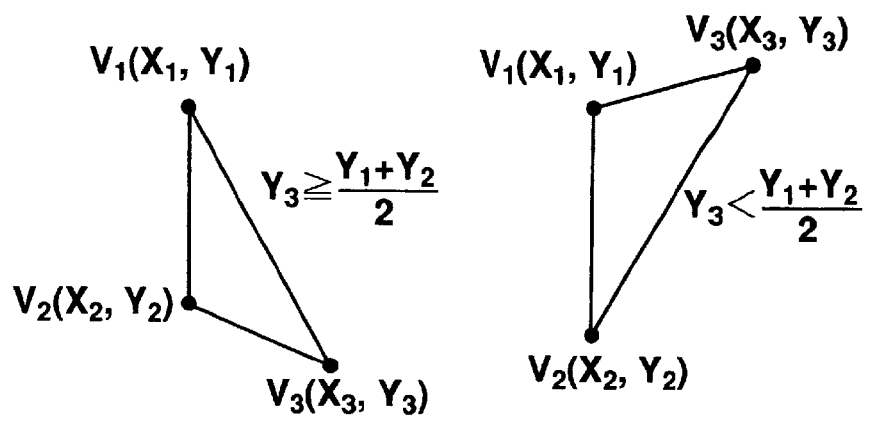
FIG. 11 is a diagram for explaining discrimination of an upward triangular texture and a downward triangular texture.

On the other hand, if it does not, or NO at S214, the current object texture is judged as a right-side texture, and the rearrangement section 16 carries out calculation for rearrangement of this texture (S215). That is, whether or not the left-side and right-side textures are both upward or downward textures is detected. Specifically, referring to FIG. 11, if $Y_3 \geq (Y_1+Y_2)/2$ is held, that texture is judged as a downward texture. On the other hand, if $Y_3 < (Y_1+Y_2)/2$ is held, that texture is judged as an upward texture.

If the left-side and right-side textures are both upward textures, as shown in FIG. 12(a), or both downward textures, the right-side texture is turned over and upside-down. If the left-side texture is an upward texture and the right-side texture is a downward texture, or vice versa, the rearrangement section 16 only turns over the right-side texture.

After the above, the rearrangement section 16 conducts the second rearranging calculation with respect to the right-side texture (S216).

Figure 13:
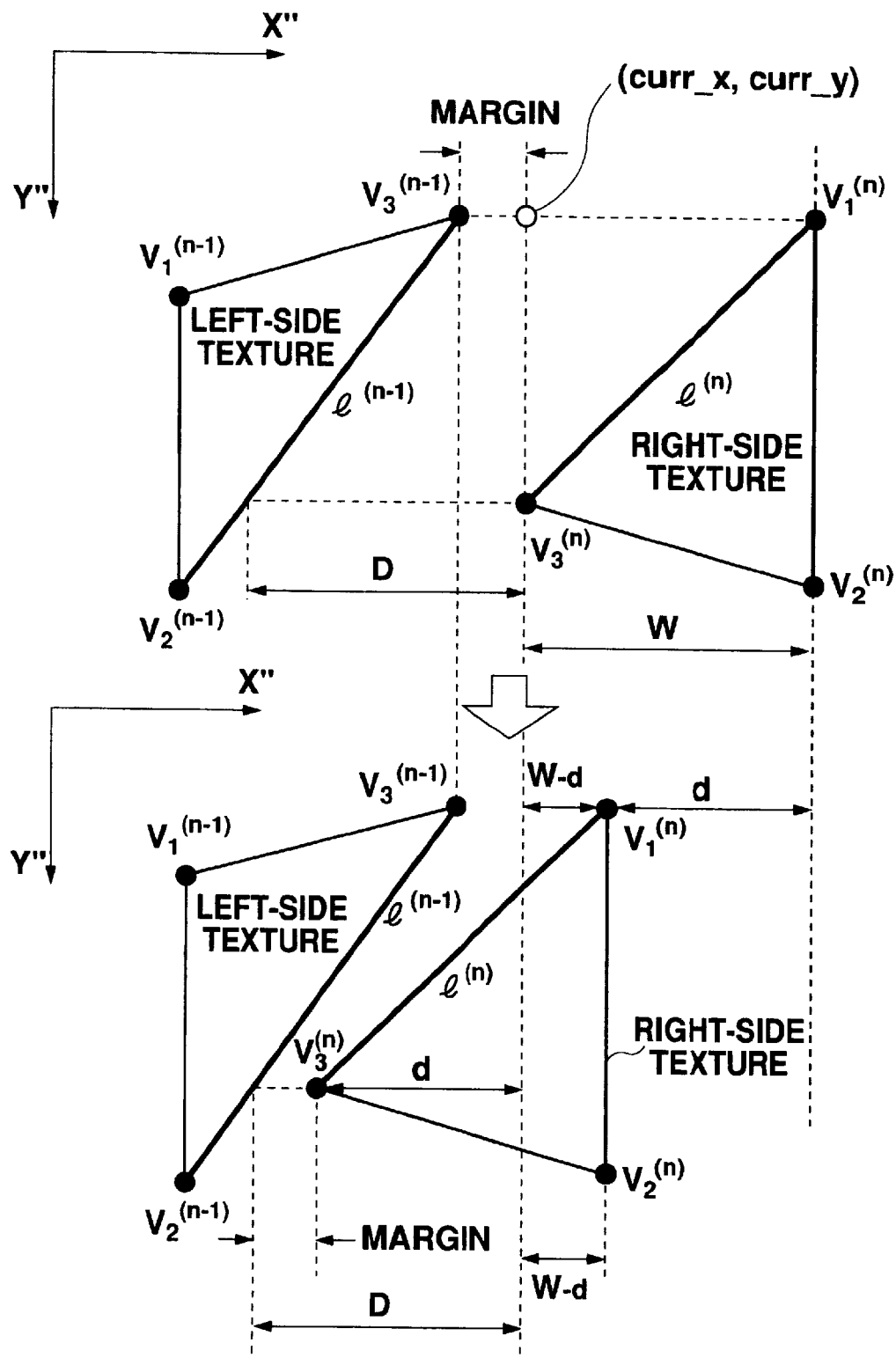
FIG. 13 is a diagram for explaining a part of the second rearrangement processing.

Here, referring to FIG. 13 for explaining rearrangement processing of a right-side texture, the $(n-1)^{th}$ texture is a left-side texture having vertexes $V_1^{(n-1)}$, $V_2^{(n-1)}$, $V_3^{(n-1)}$, while the $n^{th}$ texture is a right-side texture having vertexes $V_1^{(n)}$, $V_2^{(n)}$, $V_3^{(n)}$. By the start of the second rearranging processing, the left-side and right-side textures have been positioned, as a result of the turn-over at S215, such that the third vertex $V_3^{(n-1)}$ of the left-side texture opposes the third vertex $V_3^{(n)}$ of the right-side texture. With the left-side and right-side textures positioned as such, it is calculated how close the right-side texture can be translated toward the left-side texture in the X" axis direction. The distance by which the right-side texture is translated toward the left-side texture is referred to as a translation distance d. Also, when a line segment connecting the vertexes $V_2^{(n-1)}$ and $V_3^{(n-1)}$ of the left-side texture is denoted as $l^{(n-1)}$, and that connecting the vertexes $V_1^{(n)}$ and $V_3^{(n)}$ of the left-side texture is denoted as $l^{(n)}$, a distance by which the line segment $l^{(n)}$ can be translated toward the left-side texture in the X" axis direction until an end point of either the line segment $l^{(n-1)}$ or $l^{(n)}$ reaches the other line, is calculated. Providing that the distance is denoted as D, D-MARGIN corresponds to the translation distance d to be obtained here.

After the translation distance d is calculated, the rearrangement section 16 detects whether or not the following expression is held (S217).

$$\text{curr\_}x-d+w<\text{IMAGE\_WIDTH}-\text{SIDE\_MARGIN} \tag{6}$$

If it is, it is known that there is enough space left in the current line on the texture recording image 28 to record a right-side texture. Therefore, the rearrangement section 16 rearranges the right-side texture in the remaining space (S218). Specifically, vertex coordinates of a position where the right-side texture is to be rearranged are calculated according to the following expressions.

$$X1'=X1-d+\text{curr\_}x$$

$$X2'=X2-d+\text{curr\_}x$$

$$X3'=X3-d+\text{curr\_}x$$

$$Y1'=Y1+\text{curr\_}y$$

$$Y2'=Y2+\text{curr\_}y$$

$$Y3'=Y3+\text{curr\_}y \tag{7}$$

Subsequently, the rearrangement section 16 calculates the value of "curr_x" according to the following expression to update the reference for rearrangement of the next texture, and stores a working memory with the value.

$$\text{curr\_}x=\text{curr\_}x+w-d+\text{MARGIN} \tag{8}$$

After the above, the rearrangement section 16 returns the value of "flag" to 0 (S219) for temporarily loading a working memory with the information that the next texture is a left-side texture, which is obvious because a right-side texture has already been rearranged on the texture recording image 28 at S218. The rearrangement section 16 also updates the value of "max_h" (S212) before repeating the above rearrangement processing with respect to the next texture (S213).

Returning to S217, if the expression is not held, variables "curr_y", "max_h", and "flag" are updated according to the following expressions (S220) before conducting rearrangement processing with respect to the next texture.

$$\text{curr\_}y=\text{curr\_}y+\text{max\_}h+\text{MARGIN}$$

$$\text{max\_}h 0$$

$$\text{flag}=0 \tag{9}$$

With the aforementioned processing in which two textures of substantially the same size are paired and arranged as close as possible to each other by utilizing texture shape information, still more texture images can be arranged on a texture recording image 28.

4. Texture Normalization

The process at S218 in the second rearrangement processing may be replaced by the following processing. This processing is particularly effective when the translation distance d is too small to efficiently arrange relevant left-side and right-side texture images on a texture recording image 28. In such a case, the left-side and right-side textures are transformed into a predetermined shape (normalization) to be efficiently arranged on the texture recording image 28.

Figure 14:
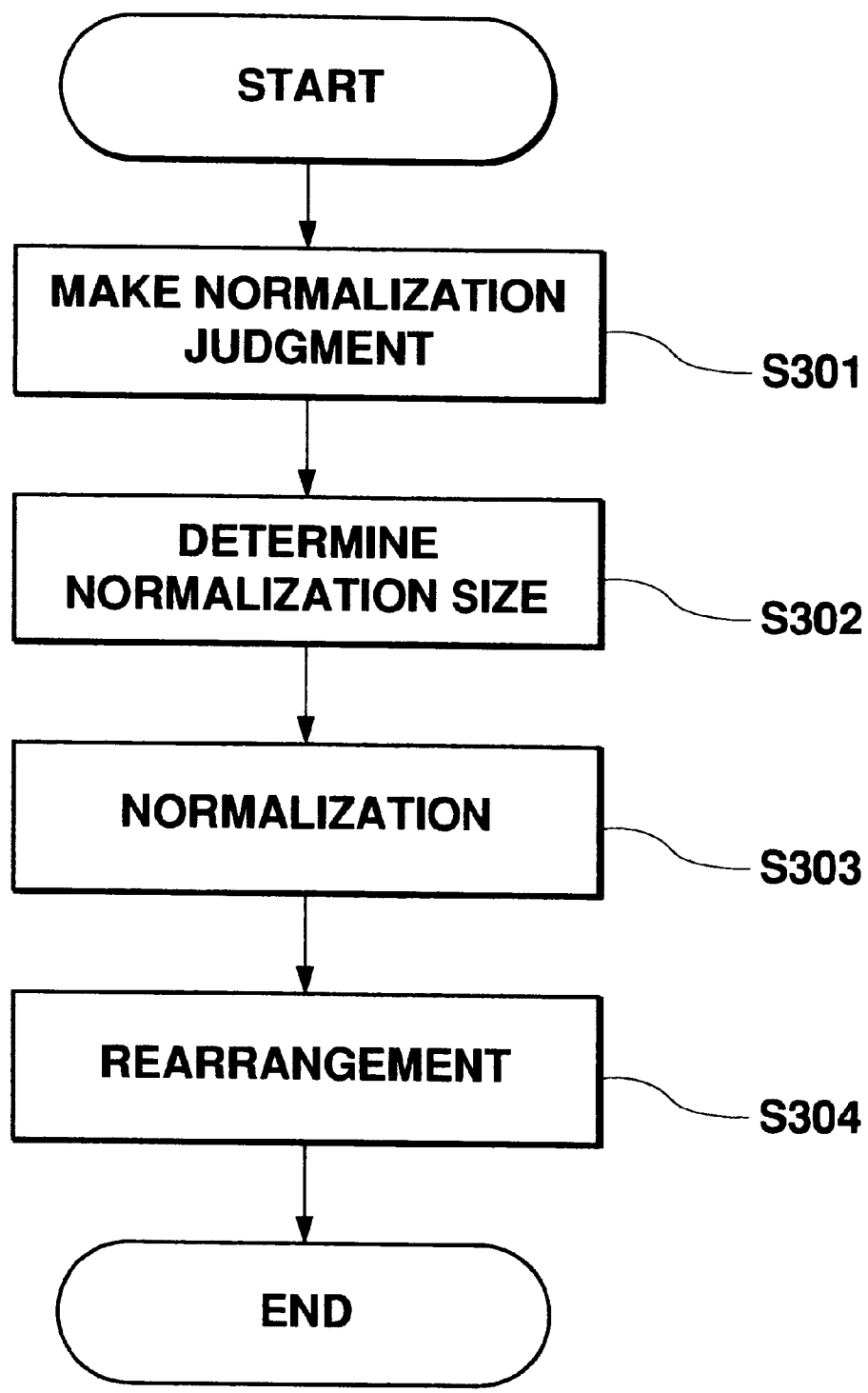
FIG. 14 is a flowchart for explaining normalization for a texture image.
Figure 15:
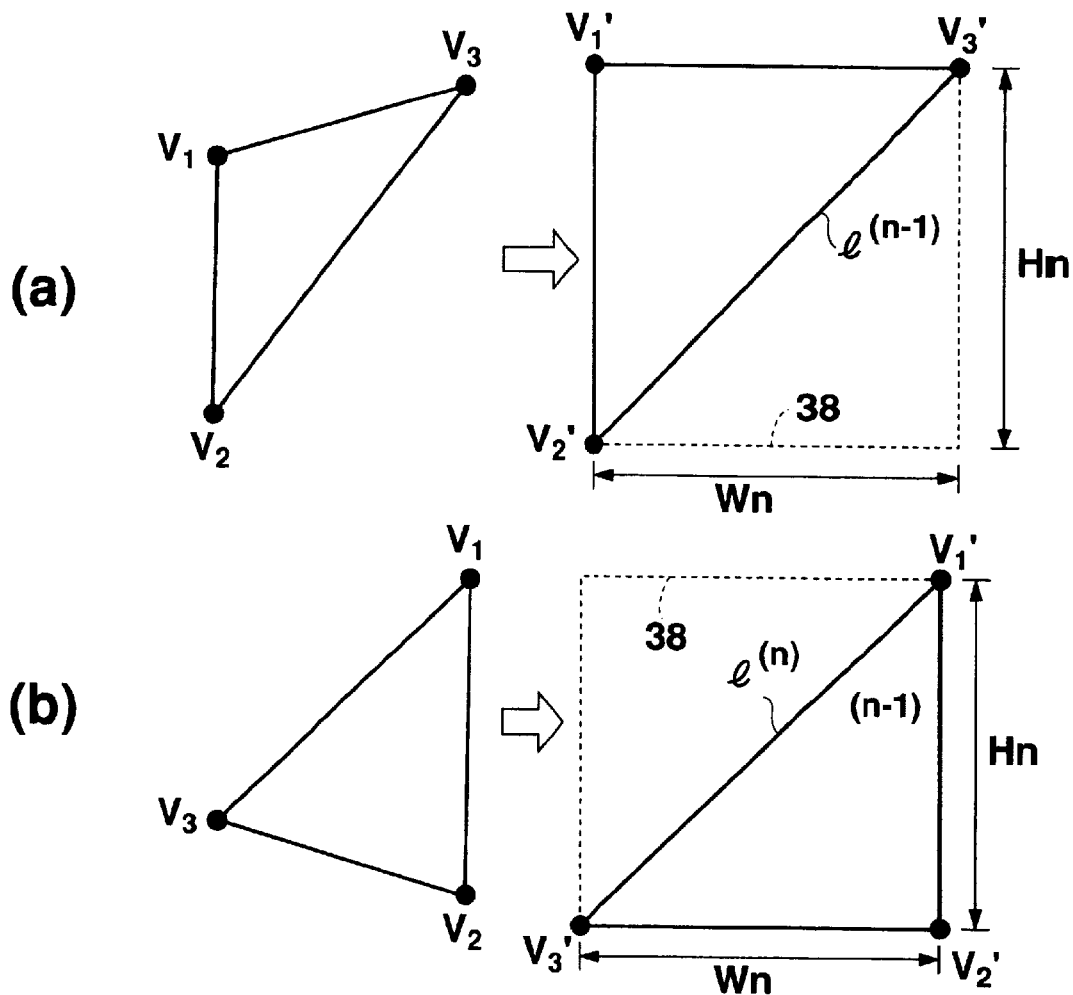
FIG. 15 is a flowchart for explaining normalization for a texture image.

Referring to FIG. 14 showing a flowchart for explaining normalization processing, the rearrangement section 16 initially makes judgement for normalization (S301). Specifically, whether or not the following expression is held is detected based on the width of the right-side texture which was calculated at S204 in FIG. 9, and the translation distance d also calculated at S216 in FIG. 10.

$$w-d>\text{THRw} \tag{10}$$

wherein THRw is a desired judgement reference value. If it is held, normalization processing proceeds. That is, when the line segment $l^{(n-1)}$ of the left-side texture is set parallel to the line segment $1^{(n)}$ of the right-side texture, as shown in FIG. 13, the translation distance d for these textures is equal to the length of one side of the circumscribed rectangle 36, or w, and the right-side texture can then be translated closest to the left-side texture. However, if the value (w−d) exceeds a threshold THRw, it is judged that the right-side texture cannot be translated closely enough to the left-side texture. In such a case, normalization is applied so that the right-side texture can be translated closer to the left-side texture.

At S302, the texture image storage section 16 determines a size for normalization, or a size into which left-side and right-side textures are to be transformed through normalization. The size can be determined by substituting the height h and width w of the circumscribed rectangles 36 of the left-side and right-side textures into the following expressions.

$$w_n = (\text{INT})((w_l + w_r)/2)/N_{step} + 0.5) \times N_{step}$$

$$h_n = (\text{INT})((h_l + h_r)/2)/N_{step} + 0.5) \times N_{step} \quad (11)$$

wherein $w_l$ is the width of the circumscribed rectangle 36 of a left-side texture, $w_r$ is the same of a right-side texture, $w_n$ is the same of a normalized texture, $h_l$ is the height of the circumscribed rectangle 36 of a left-side texture, $h_r$ is the same of a right-side texture, $h_n$ is the same of a normalized texture, and $N_{step}$ is a normalizing step so as to give the normalized textures discrete size. The circumscribed rectangle of a normalized texture will be hereinafter referred to as a normalized rectangle.

It should be noted that although the size of a texture after normalization is determined using the averaged width of the circumscribed rectangles of the left-side and right-side textures in the above, either the left-side or right-side texture may be solely used as a reference.

Then, the rearrangement section 16 executes normalization with respect to the left-side and right-side textures (S303) i.e., the section 16 determines vertex coordinates of the textures after normalization. Specifically, for a left-side texture which is, for example, an upward rectangular texture having vertexes $V_1$, $V_2$, $V_3$, the vertex $V_1$ is set on the upper left vertex of the normalized rectangle 38 which has the width $w_n$ and height $h_n$ as determined at S302; the vertex $V_2$ is set on the lower left vertex thereof; and the vertex $V_3$ is set on the upper right vertex thereof. Similarly, for a right-side texture which is a downward rectangular texture having vertexes $V_1$, $V_2$, $V_3$, the vertex $V_1$ is set on the upper right vertex of the normalized rectangle; the vertex $V_2$ is set on the lower right vertex thereof; and the vertex $V_3$ is set on the lower left vertex thereof. The upper left vertex of the normalized rectangle 38 is then set on the origin of the texture coordinate system such that two sides thereof are placed matching to the respective coordinate axes. In this way, arranged vertexes coordinates $V'_1$, $V'_2$, $V'_3$ after normalization are calculated, and stored in the reference vertex coordinate 14d column to thereby replace the data originally stored in the column 14d.

Then, based on the calculated, normalized vertex coordinates $V'_1$, $V'_2$, $V'_3$, the normalized left-side and right-side textures are arranged on the texture recording image 28 (S304). In this processing, variables "curr_x" and "curr_y" are set at the values which were used in the processing for the left-side texture, and vertex coordinates of a position where the normalized left-side texture are arranged on the texture recording image 28, are calculated according to the following expressions.

$$X_{11}' = X_{11} + \text{curr}\_x$$

$$X_{12}' = X_{12} + \text{curr}\_x$$

$$X_{13}' = X_{13} + \text{curr}\_x$$

$$X_{11}' = X_{11} + \text{curr}\_y$$

$$X_{12}' = X_{12} + \text{curr}\_y$$

$$X_{13}' = X_{13} + \text{curr}\_y \quad (12)$$

Similarly, vertex coordinates for the right-side texture are calculated according to the following expressions.

$$X_{r1}' = X_{r1} + \text{curr}\_x + \text{MARGIN}$$

$$X_{r2}' = X_{r2} + \text{curr}\_x + \text{MARGIN}$$

$$X_{r3}' = X_{r3} + \text{curr}\_x + \text{MARGIN}$$

$$Y_{r1}' = Y_{r1} + \text{curr}\_y$$

$$Y_{r2}' = Y_{r2} + \text{curr}\_y$$

$$Y_{r3}' = Y_{r3} + \text{curr}\_y \quad (13)$$

Subsequently, the rearrangement section 16 updates the value of "curr_x" according to the following expression to thereby update a reference for rearrangement of the next object texture on the texture recording image 28.

$$\text{curr}\_x = \text{curr}\_x + W_n + \text{MARGIN} \times 2 \quad (14)$$

Through the above texture normalization, left-side and right-side textures which are paired as a result of the first rearrangement can be rearranged closer to each other, so that still more textures can be recorded on the texture recording image 28.

Also, after the normalization, the line segment $1^{(n-1)}$ of the left-side texture is resultantly set parallel to the line segment $1^{(n)}$ of the right-side texture because right-side and left-side rectangular textures were transformed into rectangular textures inscribing identical rectangles 38 in normalization. This makes it possible to get the right-side and left-side textures as close as possible to each other. That is, the translation distance d of a right-side texture can be set equal to the width wn of the normalized rectangle. In other words, left-side and right-side textures can be arranged efficiently on a texture recording image 28 through transformation into congruous right-angled triangles.

It should be noted that distortion should be kept to a minimum in normalizing textures. For example, many rectangular textures are preferably transformed into a common shape of a rectangular equilateral triangle, and many quadrangular textures are preferably transformed into a common shape of a rectangular, such as, square texture. Further, a normalization size is preferably determined closer to the original size of a texture. To do so, a number of normalization object textures are preferably classified into groups according to the size so that normalization size is determined for every group.

5. Rearrangement Utilizing Texture Matching

In the above processing, at least one texture image is arranged on a texture recording image 28 so as to overlap with a part of another larger texture image. The overlapping is handled by the matching section 18.

Figure 16:
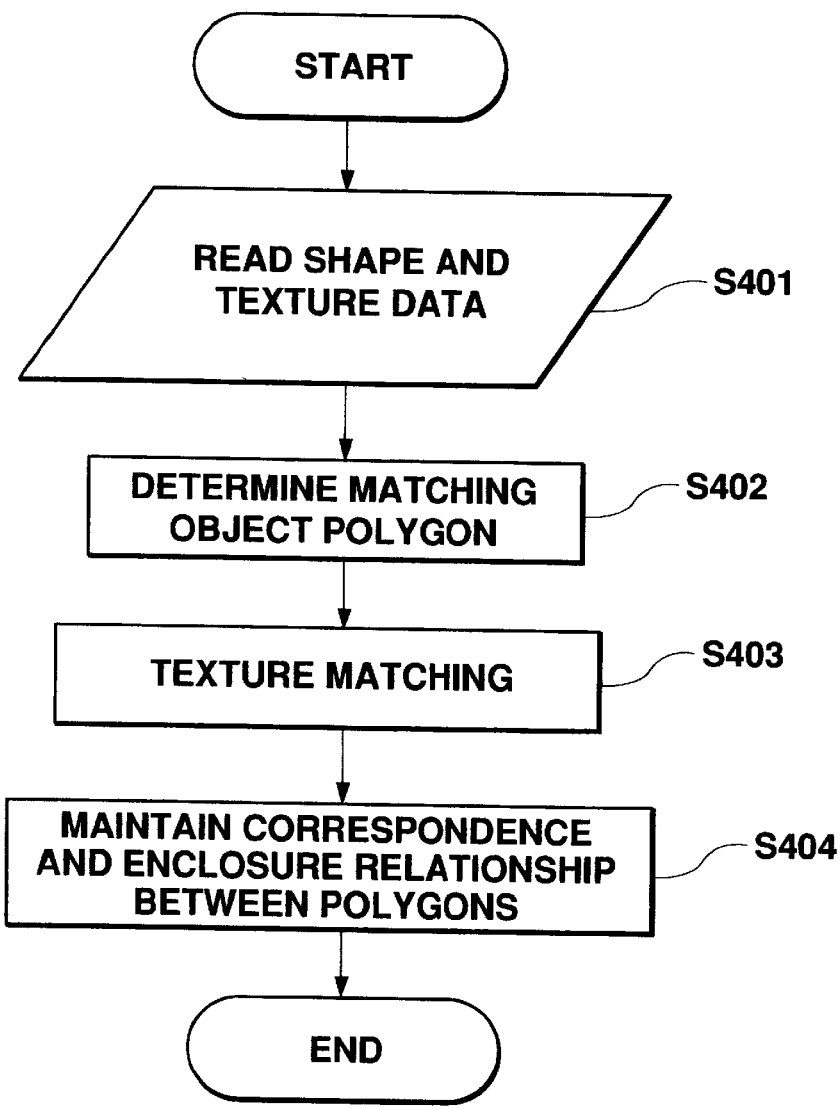
FIG. 16 is a flowchart for explaining texture matching by a matching section.
Figure 17:
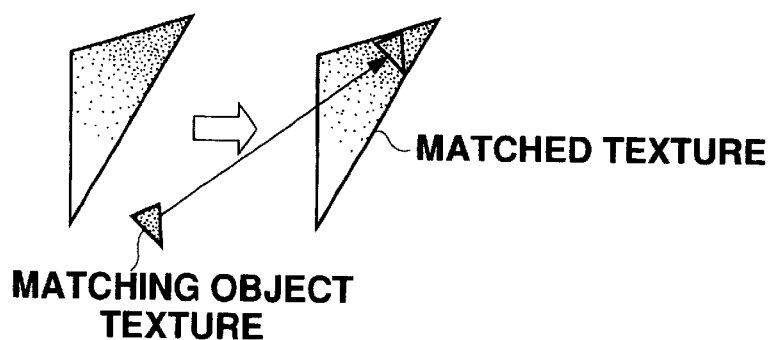
FIG. 17 is a diagram for explaining processing by the matching section.

Referring to FIG. 16 showing a flowchart for explaining matching processing, the matching section 18 reads reference vertex coordinates of each texture image from the reference vertex coordinate 14d column, and then reads a texture image from the texture original image storage section 12 (S401).

The matching section 18 then determines a matching object texture (S402). Specifically, in the case that the texture numbers 14*a* are arranged in order, for example, according to the height and width of circumscribed rectangles 36 as a result of the first rearrangement processing, a texture with a larger texture number 14*a*, i.e., a texture in a relatively small size, should be initially selected as a matching object texture.

After a matching object texture is determined, the matching section 18 has the image of the selected matching object texture matched to a part of the image of another texture (a matched texture) (S403). Specifically, the matching section 18 starts selection of a matched texture beginning with a texture with a smaller ID number stored in the data base 14, i.e., a texture in a relatively large size. To determine an appropriate matched texture, a total error or the like of the pixel values of a matching object texture and corresponding pixel values of a matched texture is calculated so as to see whether or not the resultant value is below a threshold. If it is, it is known that the matching object texture has high similarity or is highly coincident with the selected texture, and therefore the image of the selected texture is partly used also as the image of the matching object texture.

Then, the matching section 18 loads the matched texture number 14*f* column with the number of the texture which was detected at S403 as being highly coincident with the matching object texture, and loads the matching vertex coordinate 14*h* column with reference coordinates in a reference vertex system of the three points defining a position corresponding to the image of the matched object texture in the matched texture image (S404).

After the above, the memory section 20 performs a writing operation with respect to the texture image storage section 24 and the texture vertex storage section 26 based on the data in the columns 14*f* and 14*h*. Specifically, with respect to a texture which has data in columns 14*f*, 14*h*, the memory section 20 transforms the reference vertex coordinates recorded in the matching vertex coordinate 14*h* column through a 2D affin transformation, and writes the resultant vertex coordinates into the texture vertex storage section 26. The storage section 20 does not write the texture image stored in the texture original image storage section 12 into the texture image storage section 24. Note that the 2D transformation given here is identical to that given to a relevant matched texture, i.e., a texture with an ID number stored in the matched texture number 14*f* in connection with the matching object texture.

With the above processing, one texture image can also be partly used as the image of another smaller texture. This makes it possible to record still more texture images on a texture recording image 28.

In a modified example of the above processing, a part of at least one texture image may be arranged overlapping with a part of the image of another texture in a larger size.

What is claimed is:

1. A texture recording method for recording a texture recording image containing images of a number of textures in a memory, to thereby record the images of the number of textures in the memory, wherein the images of the number of textures are arranged on the texture recording image based on shape information of each texture such that a region other than a region occupied by the images is reduced on the texture recording image, and the shape information of each texture includes information about a shape of a circumscribed rectangle of each texture.

2. A texture recording method for recording a texture recording image containing images of the number of textures in a memory to thereby record the images of the number of textures in the memory, wherein a predetermined texture is transformed into a predetermined shape, and the image of the transformed texture is arranged on the texture recording image, and when the number of textures includes a triangular texture, the triangular texture is transformed into a right-angled triangle, and the image of the transformed texture having a shape of a right-angled triangle is arranged on the texture recording image.

3. A readable medium recording a texture recording image containing images of a number of textures, wherein the images of the number of textures are arranged on the texture recording image based on shape information of each texture such that a region other than a region occupied by the images is reduced on the texture recording image, and the shape information of each texture includes information about a length of one side of a circumscribed rectangle of each texture, so that the images of the number of textures are arranged on the texture recording image based on the length of one side of the circumscribed rectangle.

4. A readable medium recording a texture recording image containing images of a number of textures, wherein the images of the number of textures are arranged on the texture recording image based on shape information of each texture such that a region other than a region occupied by the images is reduced on the texture recording image, and the number of textures include triangular textures, a first predetermined number of triangular textures are arranged on the texture recording image such that a vertex thereof having the smallest angle points in a first direction, and a second predetermined number of triangular textures are arranged on the texture recording image such that a vertex thereof having the smallest angle points in a second direction which is substantially opposite to the first direction, the first predetermined number being the substantially the same number as the second predetermined number.

\* \* \* \* \*